United States Patent Office 3,541,082
Patented Nov. 17, 1970

3,541,082
STEROIDAL $\Delta^{16}$-20($\alpha$ AND $\beta$)-HYDROPEROXIDE 21-ETHERS
Joel E. Huber, Kalamazoo, Mich., assignor to The Upjohn Company, Kalamazoo, Mich., a corporation of Delaware
No Drawing. Filed Sept. 26, 1966, Ser. No. 581,700
The portion of the term of the patent subsequent to Oct. 24, 1983, has been disclaimed
Int. Cl. C07c *173/00*
U.S. Cl. 260—239.55          20 Claims

ABSTRACT OF THE DISCLOSURE

A process for the production of $\Delta^{16}$-20-keto-21-hydroxy steroids. The process involves reacting a $\Delta^{17(20)}$-21-hydroxy steroid with a vinyl ether to give the corresponding saturated ether, photosensitized oxidation yields the $\Delta^{16}$-20 ($\alpha$ and $\beta$) hydroperoxides which are converted to the $\Delta^{16}$-20-keto-21-hydroxy-21ethers followed by hydrolysis to yield the $\Delta^{16}$-20-keto-21-hydroxy steroids. The compounds are useful as intermediates and as anti-inflammatory agents.

This invention relates to (1) the reaction of $\Delta^{17(20)}$-21-hydroxy steroids (I) with vinyl ethers to produce the corresponding saturated ethers (II), (2) the photosensitized oxygenation of these (II) to yield the corresponding $\Delta^{16}$-20 ($\alpha$ and $\beta$) hydroperoxides (III), (3) the conversion of these (III) to the corresponding steroidal $\Delta^{16}$-20-keto-21-hydroxy-21-ethers (IV) and finally (4) the hydrolysis of the compounds of Formula IV to give the corresponding valuable $\Delta^{16}$-20-keto-21-hydroxy steroids (V).

The novel compounds of this invention and processes for the preparation thereof are illustratively represented by the following sequence of formulae wherein the Roman numerals therebeneath correspond with those above:

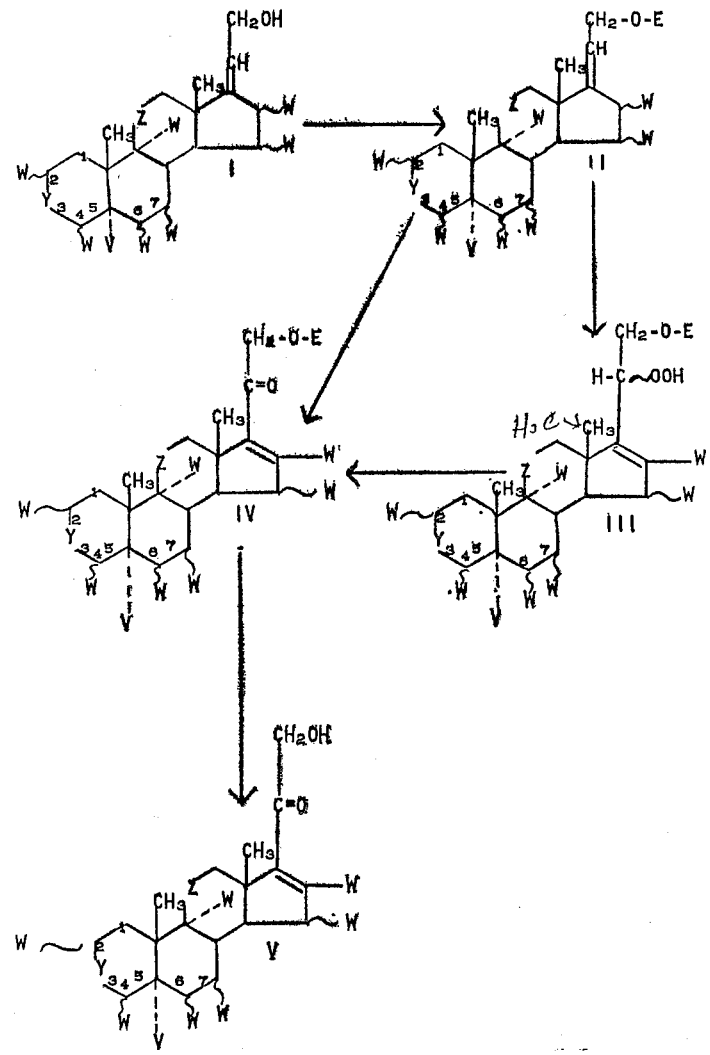

wherein the 1(2), 3(4), 4(5), 5(6) and 6(7)-carbon atom linkages are selected from the group consisting of single bonds and double bonds; ~ is a generic expression denoting α- and β-bonds and mixtures thereof; E is selected from the group consisting of

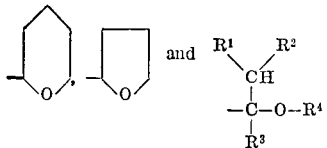

wherein $R^4$ is selected from the group consisting of alkyl, haloalkyl, nitroalkyl, alkenyl, cycloalkyl, aryl, aralkyl, haloaryl, haloaralkyl and nitroaryl of from 1 to 24 atoms, inclusive, and $R^1$, $R^2$ and $R^3$ have the same meaning as $R^4$ and in addition hydrogen; V is selected from the group consisting of hydrogen and hydroxyl, with the proviso that V is not present when the 4(5)-carbon atom linkage is a double bond; W is selected from the group consisting of hydrogen, methyl, chlorine and fluorine; Y is selected from the group consisting of the α-hydroxymethylene radical

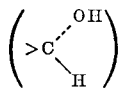

the β-hydroxymethylene radical

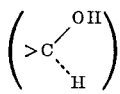

the α-acyloxymethylene radical

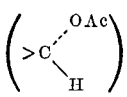

wherein Ac is the acyl radical of an organic carboxylic acid containing from one to twelve carbon atoms, inclusive, the β-acyloxymethylene radical

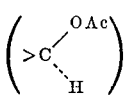

wherein Ac has the same meaning as above, the acyloxymethylidyne radical (≥C—OAc) wherein Ac has the same meaning as above, the alkoxymethylidyne radical (≥C—OR) wherein R is a lower-alkyl radical of from one to six carbon atoms, inclusive, the carbonyl radical (>C=O) and an alkylene ketal radical of the formula

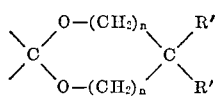

wherein $n$ is selected from the group consisting of zero and the integers one and two and R' is selected from the group consisting of hydrogen and a loweralkyl radical containing from one to six carbon atoms, inclusive; when Y is a carbonyl radical, the 1(2), 4(5), 6(7) and 9(11)-carbon atom linkages are selected from the group consisting of single and double bonds; when Y is other than a carbonyl radical, the 1(2), 3(4), 4(5), 5(6), 6(7) and 9(11)-carbon atom linkages are selected from the group consisting of single and double bonds; Z is selected from the group consisting of the methylene radical (>CH₂), the α-hydroxymethylene radical, the β-hydroxymethylene radical, the carbonyl radical and when W is selected from the group consisting of chlorine and fluorine, Z is additionally selected from the group consisting of chloromethylene and fluoromethylene; Z and W at the 9-position together constitute a 9(11)-double bond.

The novel compounds of this invention embraced by Formulae II, III, IV and V of the above flow-sheet possess valuable pharmacological properties, particularly antiinflammatory activity. This property renders them useful in the treatment of various inflammatory conditions of the skin, eyes, respiratory tract, bones and internal organs due to viral or bacterial infections, contact dermatitis, allergic reactions and rheumatoid arthritis. The compounds of the aforesaid formulae are also useful as intermediates in the preparation of a wide variety of physiologically highly active and therapeutically valuable anti-inflammatory compounds substituted at the 16-position of the steroid nucleus, e.g., the appropriate $\Delta^{16}$-20-ketones embraced by Formula V, derived from the corresponding steroids of Formula IV, can be conveniently converted by known methods to highly effective anti-inflammatory medicaments such as 9α-fluoro-11β, 16α, 17α, 21-tetrahydroxy-1,4-pregnadiene-3,20-dione (triamcinolone) and its corresponding 6α-fluoro analogue, i.e., as disclosed in J. Amer. Chem. Soc. 78, 5693 (1956) and ibid. 82, 3399 (1960), respectively. The latter is especially valuable where long-term anti-inflammatory therapy is necessary, inasmuch as its "calcium sparing" property prevents depleting the bones of calcium and consequently avoids osteoporosis which results from continued administration of certain other commonly employed corticoids.

The compounds of the present invention can be prepared and administered to mammals, birds, humans and animals in a wide variety of oral and parenteral dosage forms, singly or in a mixture with other coacting compounds. They can be associated with a carrier which can be a solid material or liquid, in which the compound is dissolved, dispersed or suspended. The solid compositions can take the form of tablets, powders, capsules, or the like, preferably in unit dosage forms for simple administration of precise dosage.

Steroidal $\Delta^{16}$-20 ketones are usually obtained from plant sapogenins (see Fieser and Fieser, "Steroids," page 547 et seq., Reinhold, New York, 1959), making them readily available, but at a very early and not necessarily convenient stage in cortical synthesis. For many purposes, it would be desirable to be able to introduce the $\Delta^{16}$-20-keto system much later in the synthetic scheme; also it would be advantageous to be independent of plant source for these intermediates, i.e., those embraced by Formula V. Dehydration of 17α-hydroxy-20-keto-steroids or their ketone derivatives (such as semi-carbazones) has been carried out by several methods, e.g., J. Amer. Chem. Soc. 78, 5693 (1956); ibid. 77, 1028 (1955); ibid. 75, 4830 (1953); U.S. Pat. 3,082,219; South African application No. 5054/59. However, the yields obtained in employing these processes are usually poor in comparison with those of the present process.

As indicated in the flow-sheet above, the compounds of Formula IV can be prepared (1) directly from the corresponding 21-ethers (II) by a "one-pot" process, or (2) by dehydration of the isolated hydroperoxy 21-ethers (III) resulting from the photosensitized oxygenation of the compounds of Formula II. Hydrolysis of the $\Delta^{16}$-20-keto 21-ethers (IV) gives the corresponding $\Delta^{16}$-20-keto-21-hydroxy steroids (V). When the $\Delta^{16}$-20-keto 21-ethers (IV) are prepared directly from the $\Delta^{17(20)}$-steroidal 21-ethers (II), the $\Delta^{16}$-20-hydroperoxides (III) are not separated from the reaction mixture, but a suitable dehydrating agent is added thereto and after an appropriate period of time has elapsed to permit the reaction to be completed, the compounds of Formula IV are recovered. Alternatively, the dehydrating agent can be added to the reaction mixture at the start of the photooxygenation along with the reagents necessary for said step. This procedure permits rearrangement of the hydroperoxides (III) in situ as they are being formed to yield the corresponding $\Delta^{16}$-20-keto 21-ethers (IV). An additional advantage of the novel process is that the ether protecting group at C-21 produces a more favorable ratio in the photosensitized oxygenation between the desired hydroperoxy 21-ethers (III) and the undesired by-products of the formula

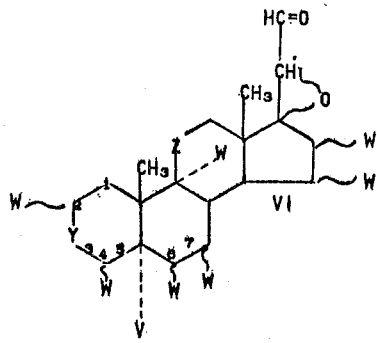

wherein 1(2), 3(4), 4(5), 5(6), 6(7), ~, E, V, W, Y and Z have the same meaning as those given therefor following the flow-sheet on page 2.

In this application unless specifically designated as cis or trans, the $CH_2OH$ group attached to the double bonded C–20 carbon atom of the starting compounds of Formula 1 includes both the cis and trans configuration and/or mixtures thereof.

(a) $\Delta^{17(20)}$-21-HYDROXY STEROIDAL OLEFINS (1)→ CORRESPONDING 21-ETHERS (II)

In carrying out this step of the process, a compound of Formula I is treated with an ether having a vinylene ($>C=C<$) group in the presence of an acid, e.g., sulfuric acid, p-toluenesulfonic acid, pyridine hydrochloride, etc. Both the cis and trans compounds of Formula I are reactive. Numerous vinyl ethers, many of which are commercially available, can be employed; for example, those set forth in Example 7, below. This reaction can be carried out, preferably in an inert organic solvent, at a wide range of temperatures, e.g., below the boiling point of the solvent and the ether.

(b) PHOTOSENSITIZED OXYGENATION OF $\Delta^{17(20)}$-STEROIDAL 21-ETHERS (II)→$\Delta^{16}$-20($\alpha$ AND $\beta$)-HYDROPEROXIDE 21-ETHERS (III)

The preferred photosensitizer is hematoporphyrin, but dyes such as the eosins, methylene blue and Rose Bengal have been found satisfactory. Advantageously, the light employed is a conventional fluorescent lamp surrounded by a glass jacket containing the steroid solution. Such an arrangement can be modified and adapted to provide a continuous flow process for large scale conversions; e.g., in vessels of large volume, irradiation can be accomplished by inserting the fluorescent lamp into glass wells or positioning them against glass ports. However, the process of the invention is not limited to the use of this particular light source. Thus, any light source producing radiation in the region of maximum absorption of the photosensitizer can be used; for example, hematoporphyrin having maximum absorption at 377 m$\mu$, Rose Bengal at 340 and 550 m$\mu$ and Eosin Y at 328 and 515 m$\mu$ can all be satisfactorily employed with a fluorescent lamp as a light source. Sun light can also be used for this purpose, as well as incandescent lamps and carbon arc lights.

The preferred solvents are acetone, pyridine, methylene chloride, ethyl acetate, and dimethylformamide; organic bases, such as picolines and collidines, are also satisfactory. Inert solvents such as benzene and ethanol can also be used.

The optimum temperature for the photosensitized oxygenation of the starting steroid (I) was found to be between about 0° C. to about 40° C., but temperatures between about −100° C. and about 80° C. are also satisfactory.

The time required for conversion of the compounds of Formula II to the corresponding 20 ($\alpha$ and $\beta$)-hydroperoxides (III) by the photosensitized oxygenation reaction depends on such factors as, light intensity, the rate of oxygen bubbling through the reaction mixture, the amount of photosensitizer present and the amount of substrate (II). Oxygen is usually bubbled through the reaction mixture throughout the course of the conversion; air can also be used. Pressure vessels charged with oxygen and illuminated either from within or through glass ports can also be used. The progress of the reaction is followed by taking aliquots for thin-layer chromatography and terminating the reaction when starting material (II) is mainly converted to the hydroperoxide (III). The extent of the conversion can also be assessed by titration of the hydroperoxide formed, or by measuring the absorption of oxygen in a closed system. The time necessary to complete the photooxygenation is between about 1 and 24 hours. Both the cis and trans compounds of Formula II are reactive.

Isolated double bonds in the steroid starting material other than at the 17(20)-position, if not conjugated with a keto group, are also amenable to the photosensitized oxygenation reaction productive of their corresponding hydroperoxides. For example, by utilizing the procedures disclosed above, the $\Delta^1$, $\Delta^2$, $\Delta^3$, $\Delta^4$, $\Delta^5$, $\Delta^6$, $\Delta^7$, $\Delta^{9(11)}$, $\Delta^{12}$, $\Delta^{14}$, $\Delta^{15}$ and $\Delta^{16}$-bonds are susceptible to this conversion.

(c) DEHYDRATION OF $\Delta^{16}$-20 ($\alpha$ AND $\beta$)-HYDROPEROXIDE 21-ETHERS (III)→CORRESPONDING $\Delta^{16}$-20-KETO 21-ETHERS (IV)

This step is accomplished by employing usual acylating conditions. Dissolving the hydroperoxide 21-ethers (III) in acetic anhydride and pyridine and allowing the reaction mixture to stand at room temperature for a peroid of about 15 hours, or warming for a short time on a steam bath, readily yields the corresponding $\Delta^{16}$-20-keto 21-ether (IV). Additional acylating agents can be used, e.g., acyl anhydrides other than acetic anhydride, acid chlorides and sulfonyl chlorides such as p-toluenesulfonyl chloride. Tertiary organic bases other than pyridine can be utilized, e.g., collidines and triethylamine. Bases such as sodium hydroxide and piperidine are also effective in converting the hydroperoxide 21-ether (III) to its $\Delta^{16}$-20-keto 21-ether (IV).

(d) CONVERSION OF $\Delta^{17(20)}$-STEROIDAL 21-ETHERS (II)→CORRESPONDING $\Delta^{16}$-20-KETO 21-ETHERS (IV) [WITHOUT ISOLATION OF $\Delta^{16}$-20 ($\alpha$ AND $\beta$)-HYDROPEROXIDE 21 ETHERS (III)]

The two steps of the above process of this invention, namely, (b) the photosensitized oxygenation of the $\Delta^{17(20)}$ steroidal 21-ethers (II) and (c) conversion by dehydration of the resulting intermediate hydroperoxide 21-ethers (III) to the corresponding $\Delta^{16}$-20-keto 21-ethers (IV), can be effected without isolating the hydroperoxide 21-ethers (III). Thus, acetic anhydride or one of the acylating agents disclosed in (c), above, is added directly to the pyridine solution containing the intermediate $\Delta^{16}$-20-hydroperoxide 21-ether (III) resulting from irradiation and oxygenation of the starting $\Delta^{17(20)}$-steroidal 21-ether (II), and after standing at room temperature about 1 to 15 hours or warming on the steam bath the $\Delta^{16}$-20-keto 21-ether product is isolated, as described in Example 15, below. Alternatively, the dehydrating agent can be added to the reaction mixture at the start of the photooxygenation, as in Example 9, below.

(e) HYDROLYSIS OF $\Delta^{16}$-20-KETO 21-ETHERS (IV)→CORRESPONDING $\Delta^{16}$ - 20 - KETO 21-HYDROXY STEROIDS (V)

The final step of the process involves the hydrolysis of a compound of Formula IV to yield the corresponding 21-hydroxy compound (V) The 21-ether (IV) is dissolved in an alkanol such as methanol and an acid, e.g., p-toluenesulfonic acid, hydrochloric acid and the like added; after standing at about room temperature for between about 0.5 to about 24 hours, followed by the addition of a base (e.g., diethylamine), the 21-hydroxy steroid (V) is isolated and purified by conventional procedures.

All of the compounds embraced by Formulae II, III, IV and V can be isolated from their reaction mixtures by conventional means, for example, when a water-miscible solvent is used, by pouring the reaction mixture into water and separating the resulting precipitate by filtration or by extraction with water-immiscible solvents. Additional purification of the product can be accomplished by conventional means, for example, by elution chromatography from an adsorbent column with a suitable solvent such as acetone, methanol, dilute methanol, ethanol, ether, methylene chloride and Skellysolve B (hexanes), mixtures and combinations of these solvents; also by gradient elution chromatography from an adsorbent column with a suitable mixture of solvents, such as methylene chloride-Skellysolve B, acetone-Skellysolve B, and the like.

It is to be understood that the invention is not to be limited to the exact details of operation or exact compounds shown and described herein as obvious modifications and equivalents will be apparent to one skilled in the art, and the invention is therefore to be limited only by the scope of the appended claims.

Example 1.—11β,21-dihydroxy-4,17(20)-cis-pregnadien-3-one 21-tetrahydropyranyl ether (II)

A slurry of 50 g. (151 mmoles) of 11β,21-dihydroxy-4,17(20)-cis-pregnadien-3-one (I) in 150 ml. (1.64 moles) of 2,3-dihydropyran and 20 ml. of methylene chloride containing 200 mg. of pyridine hydrochloride was stirred at about 50° C. After about one hour the solids had dissolved and the solution was kept at room temperature for about 16 hours. Thin layer chromatography (TLC) of this material dissolved in 50% ethyl acetate and 50% Skellysolve B (hexanes) applied to silica gel (silicic acid) and developed with a mixture of 50% ethyl acetate and 50% Skellysolve B indicated that only traces of the starting material (I) remained. The reaction was stopped by the addition of 2 ml. of diethylamine and the reaction mixture concentrated in vacuo at 50° C. to constant weight to give 75.7 g. (121%) of crude product (II) with a melting point of 104 to 121° C. A pure sample of this crude material (II) was obtained by recrystallization from acetone; this sample of 11β,21-dihydroxy-4,17(20)-cis-pregnadien-3-one 21-tetrahydropyranyl ether (II) melted at 135.5 to 138° C. and its mobility by TLC was identical to that of an authentic sampling melting at 127.5 to 130° C. Infrared (IR) and nuclear magnetic resonance (NMR) spectra were consistent with the proposed structure.

Example 2.—11β,21-dihydroxy-4,17(20)-cis-pregnadien-3-one 21-tetrahydropyranyl ether (II)

A slurry of 50 g. (151 mmoles) of 11β,21-dihydroxy-4,17(20)-cis-pregnadien-3-one (I) in 250 ml. of dry tetrahydrofuran containing 60 g. (713 mmoles) of 2,3-dihydropyran and 40 mg. of p-toluenesulfonic acid was stirred at 25° C. for about 2 hours. Since the reaction was progressing slowly, the temperature was increased to about 40° C. After stirring for about 1 hour, TLC indicated that the reaction was complete. About 50 mg. of triethylenediamine was added and the solution concentrated in vacuo. The high boiling residue was dissolved in 250 ml. of benzene and the solution washed with water. The organic layer was concentrated in vacuo to give a crude product as an oil which gradually solidified. The solid material was dried to constant weight to yield 53.8 g. of crude 11β,21-dihydroxy-4,17(20)-cis-pregnadiene-3-one 21-tetrahydropyranyl ether (II), having a melting point of 116 to 133° C.

Example 3.—11β,21-dihydroxy-4,17(20)-cis-pregnadien-3-one 21-(1'-isobutoxyethyl)ether (II)

To a stirred slurry of 50 g. of 11β,21-dihydroxy-4,17(20)-cis-pregnadien-3-one (I) in 100 ml. of tetrahydrofuran and 100 ml. of isobutyl vinyl ether, 60 mg. of p-toluenesulfonic acid monohydrate was added. The mixture was maintained initially at 25° C., but since it appeared to be reacting slowly the temperature was raised to 35° C. After 7 minutes of stirring at this temperature all of the starting material had dissolved; after 1 hour of additional stirring the reaction was stopped by the addition of 1 ml. of pyridine. The reaction mixture was added to 500 ml. of benzene and the resulting solution washed with 5% sodium bicarbonate solution followed by several water washings. The organic layer was concentrated in vacuo to constant weight to give 11β,21-dihydroxy-4,17(20)-cis-pregnadien - 3 - one 21-(1'-isobutoxyethyl)ether (II). Attempts to obtain a crystalline product failed.

Example 4.—11β,21-dihydroxy-4,17(20)-cis-pregnadien-3-one 21-(1'-methoxyethyl)ether(II)

To a stirred slurry of 3.3 g. of 11β,21-dihydroxy-4,17(20)-cis-pregnadien-3-one (I) in 15 ml. of methylene chloride at 0° C., 5.81 g. of methyl vinyl ether and 50 mg. of pyridine hydrochloride was added. The temperature was increased to 35° C. and maintained there at for about 3 hours, at which time TLC showed the reaction was nearly complete. The reaction mixture was allowed to stand at room temperature for about 16 hours. About 0.3 ml. of pyridine was added to the reaction mixture which was then concentrated to a thick slurry. Crystallization of the solids from acetone gave 2.21 g. of 11β,21-dihydroxy-4,17(20)-cis-pregnadien-3-one 21-(1'-methoxyethyl)ether (II) with a melting point of 157 to 162° C. The NMR spectrum of this product showed a characteristic methyl doublet at $\delta=1.30$ and a methoxyl at $\delta=3.31$ p.p.m. thus confirming the proposed structure of the product.

Example 5.—11β,21-dihydroxy-4,17(20)-cis-pregnadien-3-one 21-(1'-methoxy-1'-methylethyl)ether (II)

To a stirred slurry of 5 g. of 11β,21-dihydroxy-4,17(20)-cis-pregnadien-3-one (I) in 30 ml. of acetone dimethyl ketal and 20 ml. of dry tetrahydrofuran, 5 mg. of p-toluenesulfonic acid was added. After stirring at room temperature for about 1 hour, the reaction was halted by the addition of 0.2 ml. of triethylamine. The solution was concentrated in vacuo at 15° C. to a volume of about 20 ml. Addition of 25 ml. of methanol and collection of the solids by filtration gave 4.23 g. (70% yield) of product (II) melting at 161 to 165° C. Recrystallization from methanol raised the melting point of the product, 11β,21-dihydroxy-4,17(20)-cis-pregnadien-3-one 21-(1'-methoxy-1'-methylethyl)ether (II) to 164.5 to 170° C.;

$$\lambda_{max.}^{EtOH}\ 242\ m\mu\ (\epsilon=16,200)$$

*Analysis.*—Calcd. for $C_{25}H_{38}O_4$ (percent): C, 74.59; H, 9.52. Found (percent): C, 74.34; H, 9.23.

Example 6.—11β,21-dihydroxy-4,17(20)-cis-pregnadien-3-one 21-tetrahydrofuranyl ether (II)

Following the procedure of Example 1 but substituting 2,3-dihydrofuran for 2,3-dihydropyran, yields 11β,21-dihydroxy-4,17(20)-cis-pregnadien - 3 - one 21-tetrahydrofuranyl ether (II).

Example 7.—21-ethers of 11β,21-dihydroxy-4,17(20)-cis-pregnadien-3-one (II)

Following the procedures of Examples 1 through 6 but substituting for the vinyl ethers employed therein the following:
(1) phenyl vinyl ether,
(2) benzyl 2-bromopropenyl ether,
(3) benzyl vinyl ether,
(4) 2-bromovinyl methyl ether,
(5) 1-bromovinyl ethyl ether,
(6) 2-bromovinyl ethyl ether,
(7) 2-bromovinyl o-tolyl ether,
(8) 2-bromovinyl phenyl ether,
(9) 2-butyloctyl vinyl ether,
(10) butyl 1-phenylvinyl ether,
(11) p-t-butylphenyl vinyl ether,
(12) butyl 1-propylvinyl ether,
(13) 1-butylvinyl ethyl ether,
(14) 1-butylvinyl methyl ether,
(15) 2-chloroethyl vinyl ether,
(16) 2-chloro-1,2-difluorovinyl phenyl ether,
(17) 2-chloro-1,2-difluorovinyl propyl ether,
(18) 2-chloro-1,2-difluorovinyl 2,2,3,3-tetrafluoropropyl ether,
(19) 2-chloro-1-fluorovinyl ethyl ether,
(20) 2-chlorovinyl ethyl ether,
(21) 2-chlorovinyl isopropyl ether,
(22) cyclohexylmethyl vinyl ether,
(23) cyclohexyl vinyl ether,
(24) 2,2-dichloro-1-fluorovinyl methyl ether,
(25) 2,2-dichloro-1-fluorovinyl phenyl ether,
(26) 2,2-dichloro-1-fluorovinyl 2,2,2-trifluoroethyl ether,
(27) 2,4-dichlorophenyl vinyl ether,
(28) 1,2-dichlorovinyl ethyl ether,
(29) 2,2-dimethylpentyl vinyl ether,
(30) biphenyl vinyl ether,
(31) 2,2-diphenylvinyl methyl ether,
(32) docosyl vinyl ether,
(33) dodecyl vinyl ether,
(34) eicosyl vinyl ether,
(35) ethyl 1-ethylvinyl ether,
(36) ethyl vinyl ether,
(37) ethyl 1-fluoro-2,2-diphenylvinyl ether,
(38) 2-ethylhexyl vinyl ether,
(39) ethyl-1-isopentyl vinyl ether,
(40) ethyl-1-phenylvinyl ether,
(41) o, m, and p-ethylphenyl vinyl ether,
(42) 1-(p-ethylphenyl)vinyl methyl ether,
(43) ethyl 1-propylvinyl ether,
(44) ethyl 2-(2,6,6-trimethyl-1-cyclohexen-1-yl)vinyl ether,
(45) ethyl triphenylvinyl ether,
(46) ethyl 1-vinyl-1,2-butadienyl ether,
(47) ethyl 1-vinylpropenyl ether,
(48) ethynyl vinyl ether,
(49) 1-fluorovinyl 2,2,2-trifluoroethyl ether,
(50) heptyl vinyl ether,
(51) hexadecyl vinyl ether,
(52) hexyl vinyl ether,
(53) p-isohexylphenyl vinyl ether,
(54) isohexyl vinyl ether,
(55) isooctyl vinyl ether,
(56) isopentyl vinyl ether,
(57) isopentyl o(and p)-vinylphenyl ether,
(58) isopropyl vinyl ether,
(59) p-menth-1-en-8-yl- vinyl ether,
(60) p-menth-2-yl vinyl ether,
(61) p-menth-3-yl vinyl ether,
(62) 2-methylalkyl vinyl ether,
(63) 1-methyl-2-butyryl vinyl ether,
(64) 1-methylbutyl vinyl ether,
(65) p-6-methylheptylphenyl vinyl ether,
(66) 1-methyl-2-hexenyl vinyl ether,
(67) methyl 1-(p-nitrophenyl) vinyl ether,
(68) 2-methyl-2-nitropropyl vinyl ether,
(69) 2-methyloctyl vinyl ether,
(70) β-methylphenethyl vinyl ether,
(71) methyl 1-phenylvinyl ether,
(72) methyl 1-propylvinyl ether,
(73) methyl 1-p-tolylvinyl ether,
(74) methyl 1-vinylpropenyl ether,
(75) naphthyl vinyl ether,
(76) neopentyl vinyl ether,
(77) 2-nitrobutyl vinyl ether,
(78) p-nitrophenyl vinyl ether,
(79) nonyl vinyl ether,
(80) nonyl o-vinylphenyl ether,
(81) 9,11-octadecadienyl vinyl ether,
(82) 9,12-octadecadienyl vinyl ether,
(83) 9-octadecenyl vinyl ether,
(84) octyl vinyl ether,
(85) pentachlorophenyl vinyl ether,
(86) 2,2,3,3,3-pentafluoropropyl vinyl ether,
(87) 1-(1-pentenyl)-2-hexenyl vinyl ether,
(88) 4-pentenyl trifluorovinyl ether,
(89) 1-pentylhexyl vinyl ether,
(90) pentyl vinyl ether,
(91) phenethyl vinyl ether,
(92) 1-phenyl-p-tolyl vinyl ether,
(93) phenyl trichlorovinyl ether,
(94) phenyl o(and p)-vinylphenyl ether,
(95) propenyl vinyl ether,
(96) propyl o-vinylphenyl ether,
(97) propyl trifluorovinyl ether,
(98) thymyl vinyl ether,
(99) indanyl vinyl ether,
(100) m(o and p)-tolyl vinyl ether,
(101) 2,2,2-trifluoroethyl trifluorovinyl ether,
(102) trifluoroethyl vinyl ether,
(103) 2,3,5-trichlorophenyl vinyl ether,
(104) 2,3,4-trimethyl-1-cyclohexen-1-yl-methyl vinyl ether,
(105) trimethylnonyl vinyl ether and
(106) vinyl 3,5-xylyl ether, yields, respectively, (1) 11β,21 - dihydroxy - 4,17(20)-cis-pregnadien-3-one 21-(1'-phenoxyethyl) ether (II),
(2) 11β,21 - dihydroxy - 4,17(20)-cis-pregnadien-3-one 21-(1'-benzyloxy-2'-bromopropyl) ether (II),
(3) 11β,21 - dihydroxy - 4,17(20)-cis-pregnadien-3-one 21-(1'-benzyloxyethyl) ether (II),
(4) 11β,21 - dihydroxy - 4,17(20)-cis-pregnadien-3-one 21-(1'-methoxy-2'-bromoethyl) ether (II),
(5) 11β,21 - dihydroxy - 4,17(20)-cis-pregnadien-3-one 21-(1'-ethoxy-1'-bromoethyl) ether (II),
(6) 11β,21 - dihydroxy - 4,17(20)-cis-pregnadien-3-one 21-(1'-ethoxy-2'-bromoethyl) ether (II),
(7) 11β,21 - dihydroxy - 4,17(20)-cis-pregnadien-3-one 21-(1'-0-tolyloxy-2'-bromoethyl) ether (II),
(8) 11β,21 - dihydroxy - 4,17(20)-cis-pregnadien-3-one 21-(1'-phenoxy-2'-bromoethyl) ether (II),
(9) 11β,21 - dihydroxy - 4,17(20)-cis-pregnadien-3-one 21-[1'-(2'-butyloctyloxy)ethyl] ether (II),
(10) 11β,21 - dihydroxy-4,17(20)-cis-pregnadien-3-one 21-(1'-butoxy-1'-phenylethyl) ether (II), etc.

Following the procedure of Example 7 but employing the corresponding trans compounds of Formula I as starting materials yields the respective trans compounds of (1) to (10) of Formula II.

EXAMPLE 8

In this example certain of the new compounds of this invention are prepared by a novel process therefor, which is illustratively represented by the following reaction sequence:

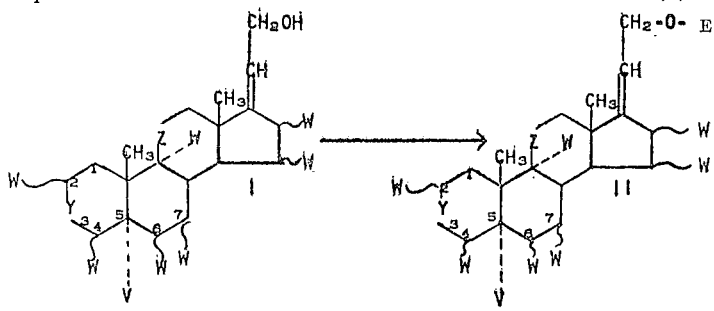

wherein 1(2), 3(4), 4(5), 5(6), 6(7), ~, E, V, W, Y and Z have the same meaning as those given therefor following the flow-sheet on page 2.

Following the precedures of Examples 1 through 7 but substituting for 11β,21 - dihydroxy - 4,17(20) - cis - pregnadien-3-one (I) the following representative starting materials (prepared as in U.S. Patent 2,781,343):

(1) 11β,21-dihydroxy-1,4,17(20)-pregnatrien-3-one (I),
(2) 11β,21-dihydroxy-4,6,17(20)-pregnatrien-3-one (I),
(3) 21-hydroxy-1,4,17(20)-pregnatriene-3,11-dione (I),
(4) 21-hydroxy-4,17(20)-pregnadiene-3,11-dione (I),
(5) 2α-methyl-21-hydroxy-4,17(20)-pregnadiene-3,11-dione (I),
(6) 11α,21-dihydroxy-1,4,17(20)-pregnatrien-3-one (I),
(7) 21-hydroxy-4,17(20)-pregnadien-3-one (I),
(8) 21-hydroxy-1,4,17(20)-pregnatrien-3-one (I),
(9) 11β,21-dihydroxy-17(20)-pregnen-3-one (I),
(10) 21-hydroxy-2α-methyl-17(20)-pregnen-3-one (I),
(11) 3β,21-dihydroxy-17(20)-pregnene (I),
(12) 3α,21-dihydroxy-17(20)-pregnene (I),
(13) 3β,11β,21-trihydroxy-17(20)-pregnene (I),
(14) 2-fluoro-11β,21-dihydroxy-1,4,17(20)-pregnatrien-3-one (I),
(15) 2-methyl-11β,21-dihydroxy-1,4,17(20)-pregnatrien-3-one (I),
(16) 4-fluoro-11β,21-dihydroxy-1,4,17(20)-pregnatrien-3-one (I),
(17) 4-methyl-11β,21-dihydroxy-1,4,7(20)-pregnatrien-3-one (I),
(18) 6α-fluoro-11β,21-dihydroxy-4,17(20)-pregnadien-3-one (I),
(19) 6α-methyl-11β,21-dihydroxy-1,4,17(20)-pregnatrien-3-one (I),
(20) 7α-methyl-11β,21-dihydroxy-4,17(20)-pregnatrien-3-one (I),
(21) 7α-fluoro-11β,21-dihydroxy-1,4,17(20)-pregnatrien-3-one (I),
(22) 9α-fluoro-11β,21-dihydroxy-4,17(20)-pregnatrien-3-one (I),
(23) 9α-fluoro-21-hydroxy-1,4,17(20)-pregnatrien-3,11-dione (I),
(24) 6α,9α-difluoro-11β,21-dihydroxy-1,4,17(20)-pregnatrien-3-one (I),
(25) 6α,9α-difluoro-21-hydroxy-4,17(20)-pregnadiene-3,11-dione (I),
(26) 6,9α-difluoro-11β,21-dihydroxy-1,4,6,17(20)-pregnatetraen-3-one (I),
(27) 9α-fluoro-21-hydroxy-6α-methyl-1,4,17(20)-pregnatriene-3,11-dione (I),
(28) 6α-fluoro-2α-methyl-11β,21-dihydroxy-1,4,17(20)-pregnatrien-3-one (I),
(29) 2α,6α-dimethyl-11β,21-dihydroxy-4,17(20)-pregnadiene-3-one (I),
(30) 2,6α-dimethyl-9α-fluoro-11β,21-dihydroxy-1,4,17(20)-pregnatrien-3-one (I),
(31) 3-(2,2-dimethylpropylenedioxy)-6β-methyl-5α,11β,21-trihydroxy-17(20)-pregnene (I),
(32) 3β,11β,21-trihydroxy-17(20)-pregnene 3-acetate (I),
(33) 3β,21-dihydroxy-17(20)-pregnen 3-acetate (I),
(34) 3α-21-dihydroxy-17(20)-pregnen 3-acetate (I),
(35) 2,9α-difluoro-11β,21-dihydroxy-6α-methyl-1,4,17(20)-pregnatrien-3-one (I),
(36) 11β,21-dihydroxy-5,17(20)-pregnadien-3-one 3-ethylene ketal (I),
(37) 21-hydroxy-4,9(11),17(20)-pregnatrien-3-one (I),
(38) 6α-fluoro-11β,21-dihydroxy-9α-methyl-4,17(20)-pregnadien-3-one (I),
(39) 11β,21-dihydroxy-6α,9α-dimethyl-1,4,17(20)-pregnatrien-3-one (I),
(40) 6α,9α-dichloro-21-hydroxy-1,4,17(20)-pregnatriene-3,11-dione (I),
(41) 6α-chloro-21-hydroxy-4,9(11),17(20)-pregnatrien-3-one (I),
(42) 11β,21-dihydroxy-2α,6α,9α-trifluoro-4,17(20)-pregnadien-3-one (I),
(43) 3-ethylenedioxy-6β-fluoro-5α,11β,21-trihydroxy-17(20)-pregnene (I),
(44) 3-ethylenedioxy-6β-methyl-5α,11β,21-trihydroxy-17(20)-pregnene (I),
(45) 15α-methyl-11β,21-dihydroxy-4,17(20)-pregnadien-3-one (I),
(46) 15β-methyl-11β,21-dihydroxy-1,4,17(20)-pregnatrien-3-one (I),
(47) 9α-fluoro-15α-methyl-11β,21-dihydroxy-1,4,17(20)-pregnatrien-3-one (I),
(48) 16α-methyl-11β,21-dihydroxy-4,17(20)-pregnadien-3-one (I),
(49) 16β-methyl-11β,21-dihydroxy-1,4,17(20)-pregnatrien-3-one (I), and
(50) 9α-fluoro-16β-methyl-11β,21-dihydroxy-1,4,17(20)-pregnatrien-3-one (I), yields, respectively, (1) 11β,21-dihydroxy-1,4,17(20)-pregnatrien-3-one 21-tetrahydropyranyl ether (II),
(2) 11β,21-dihydroxy-4,6,17(20)-pregnatrien-3-one 21-(1′-isobutoxyethyl) ether (II),
(3) 21-hydroxy-1,4,17(20)-pregnatriene-3,11-dione 21-(1′-methoxyethyl) ether (II),
(4) 21-hydroxy-4,17(20)-pregnadiene-3,11-dione 21-(1′-methoxy1′methylethyl) ether (II),
(5) 2α-methyl-2-hydroxy-4,17(20)-pregnadiene-3,11-dione 21-tetrahydrofuranyl ether (II),
(6) 11α,21-dihydroxy-1,4,17(20)-pregnatrien-3-one 21-(1′-phenoxyethyl) ether (II),
(7) 21-hydroxy-4,17(20)-pregnadien-3-one 21-(1′-docosyloxyethyl) ether (II),
(8) 21-hydroxy-1,4,17(20)-pregnatriene-3-one 21-(1′-benzyloxyethyl) ether (II),
(9) 11β,21-dihydroxy-17(20)-pregnen-3-one 21-(1′-hexadecyloxyethyl) ether (11),
(10) 21-hydroxy-2α-methyl-17(20)-pregnen-3-one 21-[1′-(octyloxy) ethyl] ether (II),
(11) 3β,21-dihydroxy-17(20)-pregnen 21-(1′-naphthoxyethyl) ether (II), etc.

Example 9.—11β,21-dihydroxy-4,16-pregnadien-3,20-dione 21-tetrahydropyranyl ether (IV)

A solution of about 151 mmoles of crude 11β,21-dihydroxy-4,17(20)-cis-pregnadien-3-one 21-tetrahydropyranyl ether (II) (obtained in Example 1), 80 mg. of hematoporphyrin in 20.4 ml. (227 mmoles) of acetic anhydride and 120 ml. of dry pyridine was placed in a 3.5 x 56 cm.

Pyrex tube having a medium porosity fritted disk at the bottom and a cold finger mounted at the top extending through the center of the tube to be fritted disk. Oxygen was passed through the disk at the rate of 0.5 cu. ft./hour while the tube containing the reactants was illuminated with four 15 watt fluorescent lamps. The temperature was maintained at about 15° C. throughout the 23 hours of photooxygenation. The completion of the photooxygenation was determined by noting the disappearance of the starting material (II) by TLC, employing silica gel with 30% ethyl acetate: 70% Skellysolve B. The reaction mixture was added to 400 ml. of water and the pyridine removed by steam distillation. The remaining mixture was extracted with three 125 ml. portions of methylene chloride. The combined extracts were washed with 150 ml. of 2 N hydrochloric acid and concentrated in vacuo to yield a high boiling residue. TLC of this material showed the major component to be 11β,21-dihydroxy-4,16-pregnadien-3,20-dione 21-tetrahydroyranyl ether (IV). A sample of pure material (IV) was obtained via column chromatography. Athough the sample remained an oil, its ultraviolet, infrared and NMR spectra proved its purity and that its structure was as predicted.

Example 10.—11β,21-dihydroxy-4,16-pregnadien-3,20-dione 21-tetrahydropyranyl ether (IV)

A solution of 16 g. (38.6 mmoles) of 11β,21-dihydroxy-4,17(20)-cis-pregnadien-3-one 21-tetrahydropyranyl ether (II) (obtained in Example 2) and 25 mg. of rose bengal dye in 100 ml. of dry acetone was placed in a 2.5 x 56 cm. Pyrex tube having a medium porosity fritted disk at the bottom and a cold finger mounted at the top extending through the center of the tube to the fritted disk. Oxygen was passed through the disk at the rate of 0.25 cu. ft./hour while the tube containing the reactants was illuminated with four 15 watt fluorescent lamps. The temperature was maintained at about 0° C. throughout the 6 hours of photooxygenation. The reaction mixture containing 20α-hydroperoxy-11β,21-dihydroxy-4,16-pregnadien-3-one 21-tetrahydropyranyl ether (III) was added to 5.67 ml. (60 mmoles) of acetic anhydride in 10 ml. of pyridine; this was kept at about 5° C. for about 36 hours. About 5 ml. of water was added to decompose the excess acetic anhydride and after standing for about 5 hours the solution was added to 500 ml. of benzene. The benzene solution was washed successively with 100 ml. of water, two 100 ml. portions of saturated 3 N hydrochloric acid, 100 ml. of water, two 100 ml. portions of saturated sodium bicarbonate solution and finally with 100 ml. of water. The dried benzene layer was passed through magnesol (magnesium silicate) to remove the remaining dye. Concentration in vacuo afforded a high boiling residue which contained the desired 11β,21-dihydroxy-4,16-pregnadien-3,20-dione 21-tetrahydropyranyl ether (IV).

Example 11.—11β,21-dihydroxy-4,16-pregnadien-3,20-dione 21-tetrahydropylranyl ether (IV)

A solution of crude 11β,21-dihydroxy-4,17(20)-cis-pregnadien-3-one 21-tetrahydropyranyl ether (prepared from 50 g. of 11β,21-dihydroxy-4,17(20)-cis-pregnadien-3-one (I) in the manner of Example 1) and 80 mg. of hematoporphyrin dye in 20.4 ml. of acetic anhydride and 120 ml. of dry pyridine was photooxygenated for about 23 hours in an apparatus similar to that described in Examples 9 and 10. The reaction mixture was added to 400 ml. of water and the pyridine removed by steam distillation. The remaining mixture was extracted with three 125 ml. portions of methylene chloride. The combined extracts were washed with 150 ml. of 2 N hydrochloric acid and concentrated in vacuo to yield a high boiling residue containing 11β,21-dihydroxy-4,16-pregnadien-3,20-dione 21-tetrahydropyranyl ether (IV).

Example 12.—11β,21-dihydroxy-4,16-pregnadien-3,20-dione 21-(1'-isobutoxyethyl) ether (IV)

The product from Example 3, 11β,21-dihydroxy-4,17(20) - cis - pregnadien - 3-one 21-(1'-isobutoxyethyl) ether (II), was dissolved in 150 ml. of acetone containing 40 mg. of rose bengal dye was photooxygenated for about 23 hours in the same apparatus as described in Example 9. Then 18.3 ml. of acetic anhydride and 30 ml. of pyridine was added as the temperature rapidly increased to about 45° C. The reaction mixture was cooled to about 25° C. and kept at this temperature for about 1 hour. The excess of acetic anhydride was hydrolyzed by the addition of 20 ml. of water. The mixture was concentrated in vacuo giving a high boiling residue to which was added 600 ml. of benzene. The benzene layer was washed thoroughly with 3 N hydrochloric acid solution followed by water. Concentration of the benzene layer produced 11β,21 - dihydroxy-4,16-pregnadien-3,20-dione 21-(1'-isobutoxy ethyl) ether (IV) as an oil.

Example 13.—11β,21-dihydroxy-4,16-pregnadien-3,20-dione 21-(1'-methoxyethyl) ether (IV)

A 2 g. sample of 11β, 21-dihydroxy-4,17(20)-cis-pregnadien-3-one 21-(1'-methoxyethyl) ether (11) (obtained in Example 4) was photooxygenated in acetone employing procedures similar to those described in Example 9 to yield 20α - hydroperoxy - 11β,21-dihydroxy-4,16-pregnadien-3-one 21-(1'-methoxyethyl) ether (III) which was (without isolation) converted to 11β,21-dihydroxy-4,16-pregnadien-3,20 dione 21-(1'-methoxyethyl) ether (IV).

Example 14

In this example certain of the new compounds of this invention are prepared by a novel process therefor, which is illustratively represented by the following reaction sequence:

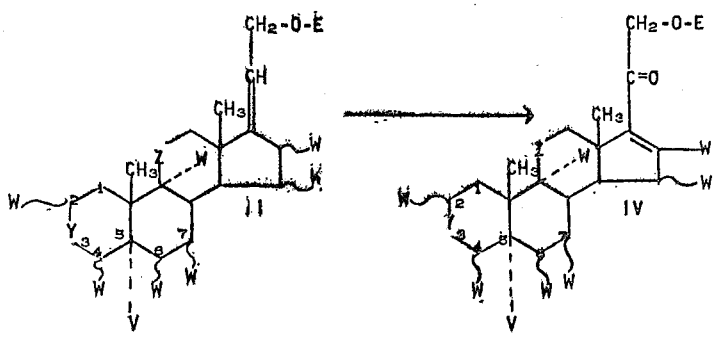

wherein 1(2), 3(4), 4(5), 5(6), 6(7), ~, E, V, W, Y and Z have the same meaning as those given therefor following the flow-sheet in column 2.

Following the procedure of Example 9 but substituting for 11β,21-dihydroxy-4,17(20-cis-pregnadien-3-one 21-tetrahydropyranyl ether (II) the following representative starting materials:

(1) 11β,21-dihydroxy-4,17 (20) - pregnadiene-3-one 21-tetrahydropyranyl ether (II),
(2) 21-hydroxy-4,17 (20)-pregnadien-3-11-dione 21-(1'-isobutoxyethyl) ether (II),
(3) 11α,21-dihydroxy-4,17 (20)-pregnadien-3-one 21-(1'-methoxyethyl) ether (II), (4) 21-hydroxy-4,6,17 (20)-pregnatrien-3-one 21-(1'-isopropoxyethyl) ether (II),
(5) 11β-21-dihydroxy-17 (20)-pregnen-3-one 21-tetrahydrofuranyl ether (II),
(6) 3β,2-dihydroxy-17 (20)-pregnene 21-(1'-methoxy-1'-fluoro12'2'-dichloroethyl) ether (II),
(7) 4-chloro-11β,21-dihydroxy-4,17 (20)-pregnadien-3-one 21-(1'-phenoxy-1'-fluoro-2',2'-dichloroethyl) ether (II),
(8) 2α-fluoro-11β,21-dihydroxy-4,17 (20)-pregnadien-3-one 21-[2',2'-dichloro-1'-fluoro-1'-(2'',2'',2''-trifluoroethoxy)ethyl] ether (II),
(9) 2α-methyl-11β,21-dihydroxy-4,6,17 (20)-pregnatrien-3-one 21-[1'-(2'',4''-dichlorophenoxy)ethyl] ether (II), and
(10) 21-hydroxy-2-methyl-1,4,17 (20)-pregnatrien-3-one 21-(1',2'-dichloro-1'-ethoxyethyl) ether (II), yields, respectively, (1) 11β,21 - dihydroxy - 4,16-pregnadien-3,20-dione 21-tetrahydropyranyl ether (IV), (2) 21 - hydroxy - 4,16-pregnadien-3,11,20-trione 21-(1'-isobutoxy ethyl) ether (IV),
(3) 11α,21-dihydroxy-4,16-pregnadien-3,20-dione 21-(1'-methoxyethyl) ether (IV),
(4) 21 - hydroxy-4,6,16-pregnatrien-3,20-dione 21-(1'-isopropoxyethyl) ether (IV),
(5) 11β,21 - dihydroxy - 16-pregnen-3,20-dione 21-tetrahydropyranyl ether (IV),
(6) 3β,21-dihyroxy-16-pregnen 21-(1'-methoxy-1'-fluoro-2',2'-dichloroethyl) ether (IV),
(7) 4 - chloro - 11β,21 - dihydroxy - 4-16-pregnen-3,20-dione 21 - (1' - phenoxy - 1'-fluoro-2'2'-dichloroethyl) ether (IV),
(8) 2α - fluoro - 11β,21-dihydroxy-4,16-pregnadien-3,20-dione 21-[2', 2' - dichloro - 1'-fluoro-1-(2'',2'',2'' - trifluoroethoxy)ethyl] ether (IV),
(9) 2α - methyl - 11β,21 - dihydroxy-4,6,16-pregnatrien-3,20-dione 21-[1'(2'',4''-dichlorophenoxy)ethyl] ether (IV), and
(10) 21 - hydroxy - 2 - methyl-1,4,16-pregnatrien-3,20-dione 21-(1',2'-dichloro-1'-ethoxyethyl) ether (IV).

The Δ16-20-ketones (IV) of (1) to (10), above can be prepared from either the cis or trans from of the corresponding Δ17(20)-compounds (II) of (1) to (10).

Example 15

(a) 20α - hydroperoxy - 11β,21-dihydroxy-4,16-pregnadien-3-one 21-(1'-methoxy-1'-methylethyl) ether (III).—A 1 g. sample of 11β,21-dihydroxy-4,17 (20)-cis-pregnadien-3-one 21 - (1' - methoxy-1'-methylethyl) ether (II) (obtained in Example 5) in 15 ml. of dry acetone containing 15 mg. of rose bengal was photooxygenated at room temperature for about 3 hours (employing the apparatus described in Example 9) to yield 20α-hydroperoxy - 11β,21 - dihydroxy-4,16-pregnadien-3-one 21-(1'-methoxy-1'-methylethyl) ether (III).

Following the procedure of Example 15(a), but substituting 11β,21 - dihydroxy-4,17 (20)-trans-pregnadien-3-one 21 - (1' - methoxy-1'-methylethyl) ether (II) also yields 20α - hydroperoxy - 11β,21 - dihydroxy-4,16-pregnadien-3-one 21-(1'-methoxy-1'-methylethyl) ether (III).

(b) 11β,21-dihydroxy - 4,16 - pregnadien-3,20-dione 21-(1'-methoxy-1'-methylethyl) ether (IV).—The material from (a), 20α-hydroperoxy-11β,21-dihydroxy - 4,16-pregnadien - 3 - one 21-(1'-methoxy-1'-methylethyl) ether (III), in pyridine and acetic anhydride is allowed to stand at room temperature for about 15 hours. The solution is then warmed briefly to about 60° C., cooled and water added. The resulting precipitate is extracted with ethyl acetate, washed with dilute hydrochloric acid, aqueous sodium bicarbonate solution, dried over sodium sulfate and the liquid evaporated to give 11β,21-dihydroxy - 4,16 - pregnadien-3,20-dione 21-(1'-methoxy-1'-methylethyl) ether (IV).

Example 16

In this example certain of the new compounds of this invention are prepared by a novel process therefor, which is illustratively represented by the following reaction sequence:

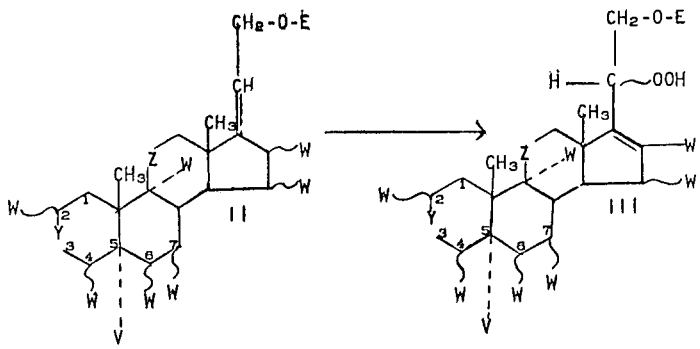

wherein 1(2), 3(4), 4(5), 5(6), 6(7), ~, E, V, W, Y, and Z have the same meaning as those given therefor following the flow-sheet on page 2.

Following the procedure of Example 15(a) but substituting for 11β21-dihydroxy - 4,17(20) - cis-pregnadien-3-one 21-(1'-methoxy - 1' - methylethyl) ether (II) the following representative cis-starting materials (prepared as in U.S. Patent 2,781,343):

(1) 11β,21-dihydroxy-1,4,17(20)-pregnatrien-3-one 21-(1'-methoxy-2'-methylpropyl) ether (II),
(2) 11β,21,dihydroxy-4,6,17(20)-pregnatrien-3-one 21-(1-methoxyethyl) ether (II),
(3) 21-hydroxy-1,4,17(20)-pregnatriene-3,11-dione 21-tetrahydropyranyl ether (II),
(4) 21-hydroxy-4,17(20)-pregnadiene-3,11-dione 21-(2',2'-dichloro-1'-fluoro-1'-phenoxyethyl) ether (II),
(5) 2α-methyl-21-hydroxy-4,17(20)-pregnadiene-3,11-dione 21-[1'-(2'',4''-dichlorophenoxy)ethyl] ether (II),
(6) 21-hydroxy-4,17(20)-pregnadien-3-one 21-tetrahydrofuranyl ether (II),
(7) 21-hydroxy-1,4,17(20)-pregnatrien-3-one 21-(1'-dodecyloxyethyl) ether (II),
(8) 2α-methyl-11β,21-dihydroxy-1,4,17(20)-pregnatrien-3-one 21-(1'-cyclohexyloxyethyl) ether (II),
(9) 4-fluoro-11β,21-dihydroxy-15α-methyl-1,4,17(20)-pregnatrien-3-one 21(1'-naphthoxyethyl) ether (II),
(10) 6α,16α-dimethyl-11β,21-dihydroxy-1,4,17(20)-pregnatrien-3-one 21-(1'-pentachlorophenoxy ethyl) ether (II), etc., yields respectively, (1) 20α-hydroperoxy-11β,21-dihydroxy-1,4,16-pregnatrien-21-(1'-methoxy-2'-methylpropyl) ether (III),
(2) 20α-hydroperoxy-11β,21-dihydroxy-4,6,16-pregnatrien-21-(1-methoxyethyl) ether, (3) 20α-hydroperoxy-21-hydroxy-1,4,16-pregnatriene-3,11-dione 21-tetrahydropyranyl ether (III),
(4) 20α-hydroperoxy-21-hydroxy-4,16-pregnadiene-3,11-dione 21-(2',2'-dichloro-1'-fluoro-1'-phenoxyethyl) ether (III),
(5) 20α-hydroperoxy-21-hydroxy-4,16-pregnadiene-3,11-dione 21-[1'-(2'',4''-dichlorophenoxy)-ethyl] ether (III),
(6) 20α-hydroperoxy-21-hydroxy-4,16-pregnadien-3-one 21-tetrahydrofuranyl ether (III),
(7) 20α-hydroperoxy-21-hydroxy-1,4,16-pregnatrien-3-one 21-(1'-dodecyloxyethyl) ether (III),
(8) 20α-hydroperoxy-2α-methyl-11β,21-dihydroxy-1,4,16-pregnatrien-3-one 21-(1'-cyclohexyloxyethyl) ether (III),
(9) 20α-hydroperoxy-4-fluoro-11β,21-dihydroxy-1,4,16-pregnatrien-3-one 21-(1'-naphthoxyethyl) ether (III),
(10) 20α-hydroperoxy-6α,16-dimethyl-11β,21-dihydroxy-1,4-16-pregnatrien-3-one 21-(1'-pentachlorophenoxy ethyl) ether (III), etc.

The mother liquors from the compounds of (1) through (10), above, yield a residue containing the corresponding 20β-hydroperoxy compounds (III).

Following the procedure of Example 15(a) but substituting the corresponding trans starting materials (II) also yields the 20α-hydroperoxy steroids (III) of (1) through (10), above.

Example 17

In this example certain of the new compounds of this invention are prepared by a novel process therefor, which is illustratively represented by the following reaction sequence:

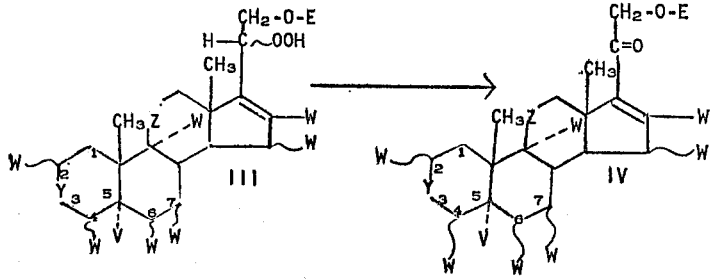

wherein 1(2), 3(4), 4(5), 5(6), 6(7), ~, E, V, W, Y and Z have the same meanings as those given therefor following the flow-sheet in column 2.

Following the procedure of Example 15(b) but substituting for 20α-hydroperoxy-11β,21-dihydroxy-4,16-pregnadien-3-one 21-(1-methoxy-1'-methylethyl) ether (III) the following representative starting materials:

(1) 20α-hydroperoxy-11β,21-dihydroxy-1,4,16-pregnatrien-3-one 21-(1'-isobutoxy ethyl) ether (III),
(2) 20α-hydroperoxy-11β,21-dihydroxy-4,6,16-pregnatrien-3-one 21-(1'-methoxyethyl) ether (III),
(3) 20α-hydroperoxy-21-hydroxy-1,4,16-pregnatriene-3,11-dione 21-tetrahydropyranyl ether (III),
(4) 20α-hydroperoxy-21-hydroxy-4,16-pregnadiene-3,11-dione 21-(2',2'-dichloro-1'-fluoro-1'-phenoxyethyl) ether (III),
(5) 20α-hydroperoxy-21-hydroxy-4,16-pregnadiene-3,11-dione 21-[1'-(2'',4''-dichlorophenoxy)ethyl] ether (III),
(6) 20α-hydroperoxy-21-hydroxy-4,16-pregnadien-3-one 21-tetrahydrofuranyl ether (III),
(7) 20α-hydroperoxy-21-hydroxy-1,4,16-pregnatrien-3-one 21-(1'-dodecyloxyethyl) ether (III),
(8) 20α-hydroperoxy-11β,21-dihydroxy-1,4,16-pregnatrien-3-one 21-(1'-eicosyloxyethyl) ether (III),
(9) 20α-hydroperoxy-3β,21-dihydroxy-16-pregnene 21-(1'-heptyloxyethyl) ether (III),
(10) 20α-hydroperoxy-11β,21-dihydroxy-15α-methyl-1,4,16-pregnatrien-3-one 21-(1'-naphthoxyethyl) ether (III), etc., yields, respectively, (1) 11β,21-dihydroxy-1,4,16-pregnatrien-3,20-dione 21-(1'-isobutoxyethyl) ether (IV),
(2) 11β,21-dihydroxy-4,6,16-pregnatrien-3,20-dione 21-(1'-methoxyethyl) ether (IV),
(3) 21-hydroxy-1,4,16-pregnatrien-3,11,20-trione 21-tetrahydropyranyl ether (IV),
(4) 21-hydroxy-4,16-pregnadien-3,11,20-trione 21-(2',2'-dichloro-1'-fluoro-1'-phenoxyethyl) ether (IV),
(5) 21-hydroxy-4,16-pregnadien-3,11,20-trione 21-[1'-(2'',4''-dichlorophenoxy)ethyl] ether (IV),
(6) 21-hydroxy-4,16-pregnadien-3,20-dione 21-tetrahydrofuranyl ether (IV),
(7) 21-hydroxy-1,4,16-pregnatrien-3,20-dione 21-(1'-dodecyloxyethyl) ether (IV),
(8) 11β,21-dihydroxy-1,4,16-pregnatrien-3,20-dione 21-(1'-eicosyloxyethyl) ether (IV),
(9) 3β,21-dihydroxy-16-pregnene-20-one 21-(1-heptyloxyethyl) ether (IV),
(10) 11β,21-dihydroxy-4,15α-methyl-1,4,16-pregnatriene-3,20-dione 21-(1-naphthoxyethyl) ether (IV), etc.

Following the procedure of Example 15 but substituting the corresponding 20β-hydroperoxides (III) for the 20α-hydroperoxy starting materials (III) in (1) to (10), above, also yields the 20-keto-products of Formula IV in (1) to (10), above.

Example 18.—11β-21-dihydroxy-4,16-pregnadiene-3,20-dione (V)

The product from Example 9, 11β,21-dihydroxy-4,16-pregnadien-3,20-dione 21-tetrahydropyranyl ether (IV), was dissolved in 250 ml. of methanol and to this 250 mg. of p-toluenesulfonic acid was added. After standing at room temperature for about 45 minutes, TLC showed the exchange of the tetrahydropyranyl ether group for that of hydroxyl was complete. After the addition of 2 ml. of diethylamine, the methanol was removed in vacuo. The residue was taken up in 200 ml. of benzene for crystallization. After standing at room temperature for about 16 hours, the solids were collected by filtration to give, after drying, 30.64 g. [58.9% yield from starting material (1)] of 11β,21-dihydroxy-4,16-pregnadien-3,20-dione (V), melting at 154 to 159° C. An analytical sample of this material was obtained by recrystallization from benzene and had a melting point of 157 to 158.5° C., $\lambda_{max.}^{EtOH}$ 241 mμ ($\epsilon = 22,900$)

The infrared and NMR spectra supported the assigned structure.

Example 19.—11β,21-dihydroxy-4,16-pregnadien-3,20-dione (V)

The product residue obtained in Example 10, 11β,21-dihydroxy-4,16-pregnadien-3,20-dione 21-tetrahydropyranyl ether (IV), was dissolved in 60 ml. of benzene and 15 ml. of methanol. To this 1 drop of concentrated hydrochloric acid was added with stirring. After about 1 hour an additional drop of hydrochloric acid was added. After stirring at about 25° C. for about 16 hours, the solution was concentrated to 40 ml. by distillation. Then 25 ml. of Skellysolve B was added. Filtration gave 8.87 g. of crude product V. Recrystallization from a mixture of benzene and Skellysolve B gave 6.24 g. (44% yield)

of 11β,21-dihydroxy-4,16-pregnadien-3,20-dione (V), melting at 157.2 to 159° C. An analytical sample was obtained by recrystallization from benzene which melted at 157 to 158.5° C. and with $$\lambda_{max.}^{EtOH} \text{ at } 241 \text{ m}\mu \ (\epsilon = 22,900)$$

Example 20.—11β,21-dihydroxy-4,16-pregnadien-3,20-dione (V)

The product residue obtained in Example 11, 11β,21-dihydroxy-4,16-pregnadien-3,20-dione 21-tetrahydropyranyl ether (IV), was dissolved in 250 ml. of methanol and 250 ml. of p-toluenesulfonic added. After standing at room temperature for about 45 minutes, 2 ml. of diethylamine was added and the solution concentrated in vacuo. The residue was taken up in 250 ml. of benzene. After standing, 30.6 g. (59% yield) of 11β,21-dihydroxy-4,16-pregnadien-3,20-dione (V) melting at 154 to 159° C. was collected by filtration.

Example 21.—11β,21-dihydroxy-4,16-pregnadien-3,20-dione (V)

The oily product obtained in Example 12, namely, 11β,21-dihydroxy-4,16-pregnadien-3,20-dione 21-(1'-isobutoxyethyl) ether (IV), was taken up in 200 ml. of methanol and to this 50 mg. of p-toluenesulfonic acid was added. After standing at room temperature for about 40 minutes, 1 ml. of diethylamine was added and the solution concentrated in vacuo. The residue was taken up in 200 ml. of benzene and the crystals that separated were removed by filtration to yield 12.06 g. (23% yield) of 11β,21-dihydroxy-4,16-pregnadien-3,20-dione (V) melting at 127.5 to 152.5° C.

Example 22.—11β,21-dihydroxy-4,16-pregnadien-3,20-dione (V)

The product obtained in Example 13, 11β,21-dihydroxy-4,16-pregnadien-3,20-dione 21-(1'-methoxyethyl) ether (IV), was treated in the same manner as the 11β,21-dihydroxy-4,16-pregnadien-3,20-dione 21-tetrahydropyranyl ether (IV) employed as starting material in Example 18. This procedure yielded pure 11β,21-dihydroxy-4,16-pregnadien-3,20-dione (V).

Example 23.—11β,21-dihydroxy-4,16-pregnadien-3,20-dione (V)

The product obtained in Example 15(b), namely, 11β,21-dihydroxy-4,16-pregnadien-3,20-dione 21-(1'-methoxy-1'-methylethyl) ether (IV), was treated with methanol and p-toluenesulfonic acid in accordance with the procedure of Example 18 to yield pure 11β,21-dihydroxy-4,16-pregnadien-3,20-dione (V).

Example 24

In this example certain of the new compounds of Formula IV of this invention are converted to those of Formula V by the following reaction sequence:

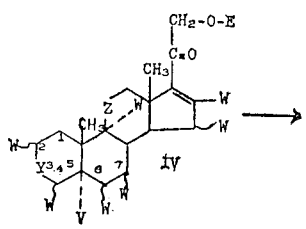

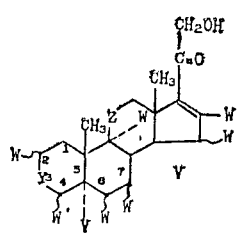

wherein 1(2), 3(4), 4(5), 5(6), 6(7), ~, E, V, W, Y and Z have the same meaning as those given therefor following the flow-sheet in column 2.

Following the procedure of Example 18 but substituting for 11β,21-dihydroxy-4,16-pregnadien-3,20-dione 21-tetrahydropyranyl ether (IV) the following representative starting materials:

(1) 11β,21-dihydroxy-1,4,16-pregnatriene-3,20-dione 21-tetrahydrofuranyl ether (IV),
(2) 6α-methyl-3α,11β,21-trihydroxy-16-pregnene-20-one 21-[1'-(2",4"-dichlorophenoxyethyl] ether (IV),
(3) 9α-fluoro-11β,21-dihydroxy-1,4,6,16-pregnatetraen-3,20-dione 21-(1'-dodecyloxyethyl) ether (IV),
(4) 11b,21-dihydroxy-5,16-pregnadiene-3,20-dione 3-ethylene ketal 21-(1'-phenoxyethyl) ether (IV),
(5) 16β-methyl-11β,21-dihydroxy-4,16-pregnadien-3,20-dione 21-(1'-naphthoxyethyl) ether (IV), etc., yields respectively, (1) 11β,21-dihydroxy-1,4,16-pregnatrien-3,20-dione (V),
(2) 6α-methyl-3α,11β,21-trihydroxy-16-pregnen-20-one (V),
(3) 9α-fluoro-11β,21-dihydroxy-1,4,16-pregnatetraen-3,20-dione (V),
(4) 11β,21-dihydroxy-5,16-pregnadien-3,20-dione 3-ethylene ketal (V),
(5) 16β-methyl-11β,21-dihydroxy-4,16-pregnadien-3,20-dione (V), etc.

I claim:
1. Compounds of the formula

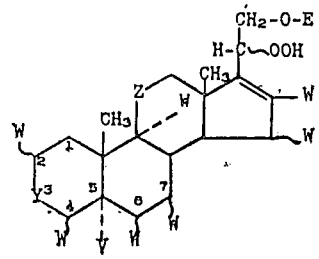

wherein the 1(2), 3(4), 4(5), 5(6) and 6(7)-carbon atom linkages are selected from the group consisting of single bonds and double bonds; ~ is a generic expression denoting α- and β-bonds and mixtures thereof; E is selected from the group consisting of

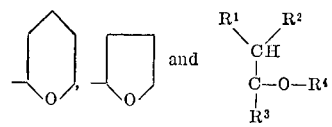

wherein $R^4$ is selected from the group consisting of alkyl, haloalkyl, nitroalkyl, alkenyl, cycloalkyl, aryl, aralkyl, haloaryl haloarylkyl and nitroaryl of from 1 to 24 carbon atoms, inclusive; and $R^1$, $R^2$ and $R^3$ have the same meaning as $R^4$ and in addition hydrogen; V is selected from the group consisting of hydrogen and hydroxy, with the proviso that V is not present when the 4(5)- or 5(6)-carbon atom linkage is a double bond; W is selected from the group consisting of hydrogen, methyl, chlorine and fluorine; Y is selected from the group consisting of the α-hydroxymethylene radical

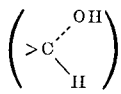

the β-hydroxymethylene radical

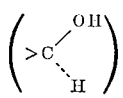

the α-acyloxymethylene radical

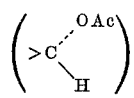

wherein Ac is the acyl radical of a hydrocarbon carboxylic acid containing from one to twelve carbon atoms, inclusive, the β-acyloxymethylene radical

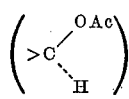

wherein Ac has the same meaning as above, the acyloxy methylidyne radical ($\geqslant$C—OAc) wherein AC has the same meaning as above, the alkoxymethylidyne radical ($\geqslant$C—OR) wherein R is a lower-alkyl radical of from one to six carbon atoms, inclusive, the carbonyl radical (>C-O) and an alkylene ketal radical of the formula

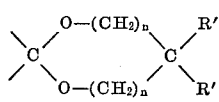

wherein $n$ is selected from the group consisting of zero and the integers one and two and R' is selected from the group consisting of hydrogen and a lower-alkyl radical containing from one to six carbon atoms, inclusive; when Y is a carbonyl radical the 1(2), 4(5), 6(7) and 9(11)-carbon atom linkages are selected from the group consisting of single and double bonds; when Y is other than a carbonyl radical the 1(2), 3(4), 4(5), 5(6), 6(7) and 9(11)-carbon atom linkages are selected from the group consisting of single and double bonds; Z is selected from the group consisting of the methylene radical (>CH$_2$), the α-hydroxymethylene radical, the β-hydroxymethylene radical, the carbonyl radical and when W is selected from the group consisting of chlorine and fluorine, Z is additionally selected from the group consisting of chloromethylene and fluoromethylene; Z and W at the 9-position together constitute a 9(11)-double bond.

2. A compound in accordance with claim 1, namely, 20α-hydroperoxy - 11β,21 - dihydroxy-4,16-pregnadien-3-one 21- tetrahydropyranyl ether of the formula

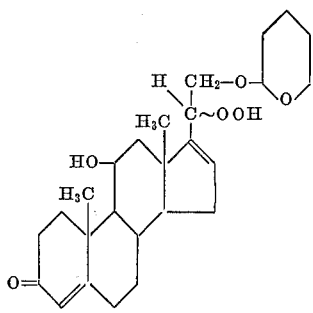

3. A compound in accordance with claim 1, namely, 20α-hydroperoxy - 11β,21 - dihydroxy-1,4,16-pregnatrien-3-one 21-tetrahydropyranyl ether of the formula

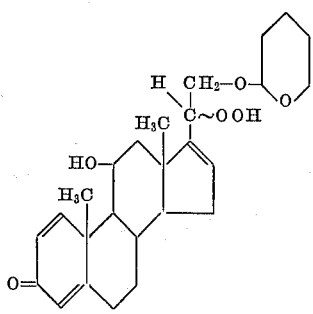

4. A compound in accordance with claim 1, namely, 20α-hydroperoxy - 11β,21 - dihydroxy 4,16-pregnadien-3-one 21-(1'-isobutoxyethyl) ether.

5. A compound in accordance with claim 1, namely, 20α-hydroperoxy-11β,21 - dihydroxy 4,16-pregnadien-3-one 21-(1'-ethoxy-1-methylethyl) ether.

6. A compound in accordance with claim 1, namely, 20α - hydroperoxy - 11β,21 - dihydroxy 4,16-pregnadien-3-one 21-(1'-methoxyethyl) ether.

7. A process for the production of a compound of claim 1 of the Formula IV

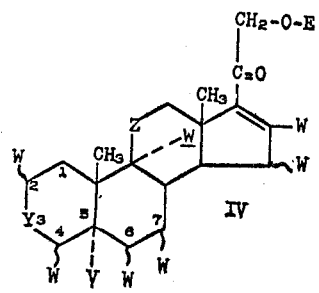

wherein the 1(2), 3(4), 4(5), 5(6), and 6(7)-carbon atom linkages are selected from the group consisting of single bonds and double bonds; ∼ is a generic expression denoting α- and β-bonds and mixtures thereof; E is selected from the group consisting of

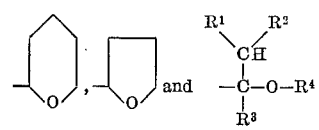

wherein R$^4$ is selected from the group consisting of alkyl, haloalkyl, nitroalkyl, alkenyl, cycloalkyl, aryl, aralyl, haloaryl, haloaralkyl and nitroaryl of from 1 to 24 carbon atoms, inclusive; and R$^1$, R$^2$ and R$^3$ have the same meaning as R$^4$ and in addition hydrogen; V is selected from the group consisting of hydrogen and hydroxy with the proviso that V is not present when the 4(5)- or 5(6)-carbon atom linkage is a double bond; W is selected from the group consisting of hydrogen, methyl, chlorine and fluorine; Y is selected from the group consisting of the α-hydroxymethylene radical

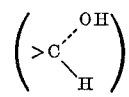

the β-hydroxymethylene radical

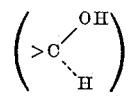

the α-acyloxymethylene radical

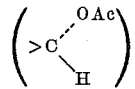

wherein Ac is the acyl radical of an organic carboxylic acid containing from one to twelve carbon atoms, inclusive, the β-aceyloxymethylene radical

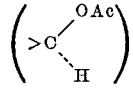

wherein Ac has the same meaning as above, the acyloxymethylidyne radical (≥C—OAc) wherein Ac has the same meaning as above, the alkoxymethylidyne radical (≥C—OR) wherein R is a lower-alkyl radical of from one to six carbon atoms, inclusive, the carbonyl radical (>C=O) and an alkylene ketal radical of the formula

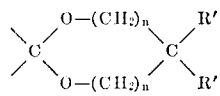

wherein n is selected from the group consisting of zero and the integers one and two and R' is selected from the group consisting of hydrogen and a lower-alkyl radical containing from one to six carbon atoms, inclusive; when Y is a carbonyl radical the 1(2), 4(5), 6(7) and 9(11)-carbon atom linkages are selected from the group consisting of single and double bonds; when Y is other than a carbonyl radical the 1(2), 3(4), 4(5), 5(6), 6(7) and 9(11)-carbon atom linkages are selected from the group consisting of single and double bonds; Z is selected from the group consisting of the methylene radical (>CH₂), the α-hydroxymethylene radical, the β-hydroxymethylene radical, the carbonyl radical and when W is selected from the group consisting of chlorine and fluorine, Z is additionally selected from the group consisting of chloromethylene and fluoromethylene; Z and W at the 9-position together constitute a 9(11)-double bond, which comprises subjecting to dehydration at the 20-position a corresponding compound of the Formula III

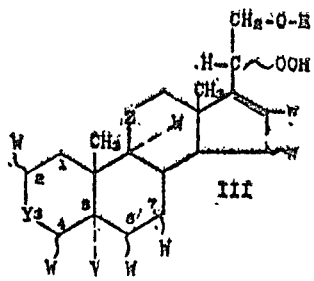

wherein 1(2), 3(4), 4(5), 5(6), 6(7), ∼, E, V, W, Y and Z have the same meaning as above.

8. A process in accordance with claim 7 for the production of 11β,21-dihydroxy-4,16-pregnadien-3,20-dione 21-tetrahydropyranyl ether (IV) which comprises subjecting to dehydration at the 20-position 20α-hydroperoxy-11β,21-dihydroxy-4,16-pregnadien - 3 - one 21-tetrahydropyranyl ether (III).

9. A process in accordance with claim 7 for the production of 11β,21dihydroxy-4,16-pregnadien-3,20-dione 21-tetrahydropyranyl ether (IV) which comprises subjecting to dehydration at the 20-position with a base 20α-hydroperoxy-11β,21-dihydroxy-4,16-pregnadien-3-one 21-tetrahydropyranyl ether (III).

10. A process in accordance with claim 7 for the production of 11β,21-dihydroxy-1,4,16-pregnatriene-3,20-dione 21-tetrahydropyranyl ether (IV) which comprises subjecting to dehydration at the 20-position 20α-hydroperoxy-11β,21 - dihydroxy - 1,4,16 - pregnatrien - 3 - one 21 - tetrahydropyranyl ether (III).

11. A process in accordance with claim 7 for the production of 11β,21-dihydroxy-1,4,16-pregnatrien-3,20-dione 21-tetrahydropyranyl ether (IV) which comprises sub-subjecting to dehydration at the 20-position with a base 20α - hydroperoxy - 11β,21 - dihydroxy - 1,4,16 - pregnatrien-3-one 21-tetrahydropyranyl ether (III).

12. A process for the production of a compound of the Formula IV

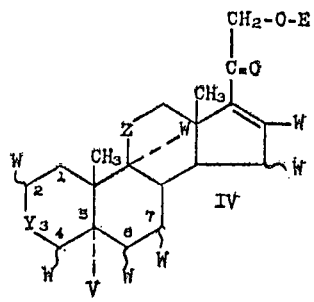

wherein the 1(2), 3(4), 4(5), 5(6) and 6(7)-carbon atom linkages are selected from the group consisting of single bonds and double bonds; ∼ is a generic expression denoting α- and β-bonds and mixtures thereof; E is selected from the group consisting of

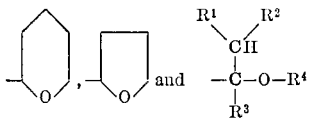

wherein R⁴ is selected from the group consisting of alkyl, haloalkyl, nitroalkyl, alkenyl, cycloalkyl, aryl, aralkyl, haloaryl, haloaralkyl andnitroaryl of from 1 to 24 carbon atoms, inclusive; and R¹, R², and R³ have the same meaning as R⁴ and in addition hydrogen; V is selected from the group consisting of hydrogen and hydroxy with the proviso that V is not present when the 4(5)- or 5(6)-carbon atom linkage is a double bond; W is selected from the group consisting of hydrogen, methyl, chlorine and fluorine; Y is selected from the group consisting of the α-hydroxymethylene radical

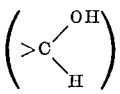

the β-hydroxymethylene radical

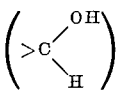

the α-acyloxymethylene radical

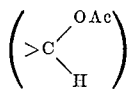

wherein Ac is the acyl radical of an organic carboxylic acid containing from one to twelve carbon atoms, inclusive, the β-acyloxymethylene radical

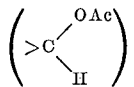

wherein Ac has the same meaning as above, the acyloxymethylidyne radical (≥C—OAc) wherein Ac has the same meaning as above, the alkoxymethylidyne radical (≥C—OR) wherein R is a lower-alkyl radical of from one to six carbon atoms, inclusive, the carbonyl radical (>C=O) and an alkylene ketal radical of the formula

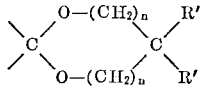

wherein n is selected from the group consisting of zero and the integers one and two and R' is selected from the group consisting of hydrogen and a loweralkyl radical containing from one to six carbon atoms, inclusive; when Y is a carbonyl radical the 1(2), 4(5), 6(7) and 9(11)-carbon atom linkages are selected from the group consisting of single and double bonds; when Y is other than a carbonyl radical the 1(2), 3(4), 4(5), 5(6), 6(7) and 9(11)-carbon atom linkages are selected from the group consisting of single and double bonds; Z is selected from the group consisting of the methylene radical (>CH₂), the α-hydroxymethylene radical, the β-hydroxymethylene radical, the carbonyl radical and when W is selected from the group consisting of chlorine and fluorine, Z is additionally selected from the group consisting of chloromethylene and fluoromethylene; Z and W at the 9-position together constitute a 9(11)-double bond, which comprises (1) subjecting to photosensitized oxygenation a corresponding compound of the Formula II

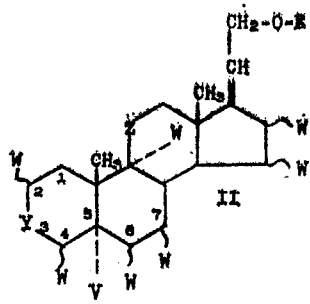

wherein 1(2), 3(4), 4(5), 5(6), 6(7), ~, E, V, W, Y, and Z have the same meaning as above, to produce a corresponding compound of the Formula III

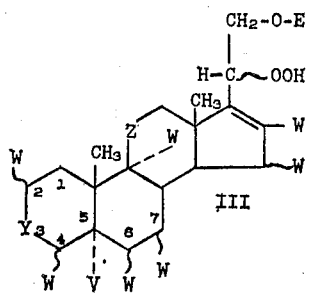

wherein 1(2), 3(4), 4(5), 5(6), 6(7), ~, E, V, W, Y, and Z have the same meanings as above, and (2) subjecting a thus produced corresponding compound of Formula III to dehydration at the 20-position to yield a corresponding compound of Formula IV, above.

13. A process in accordance with claim 12 for the production of 11β,21 - dihydroxy-4,16-pregnadiene-3,20-dione 21-tetrahydropyranyl ether (IV) which comprises (1) subjecting 11β, 21-dihydroxy-4,17(20)-cis-pregnadien-3-one 21-tetrahydropyranyl ether (II) to photosensitized oxygenation to yield 20α-hydroperoxy-11β,21-dihydroxy-4,16-pregnadien-3-one 21-tetrahydropyranyl ether (III) and (2) subjecting the thus produced compound (III) to dehydration at the 20-position to yield 11β,21-dihydroxy-4,16-pregnadiene-3,20-dione 21-tetrahydropyranyl ether (IV).

14. A process in accordance with claim 12 for the production of 11β,21 - dihydroxy-4,16-pregnadiene-3,20-dione 21-tetrahydropyranyl ether (IV) which comprises (1) treating 11β,21-dihydroxy-4,17(20)-cis-pregnadien-3-one 21-tetrahydropyranyl ether (II) with oxygen in the presence of hematoporphyrin during irradiation with fluorescent light to yield 20α-hydroperoxy-11β,21-dihydroxy-4,16-pregnadien-3-one 21-tetrahydropyranyl ether (III) and (2) dehydrating at the 20-position the thus produced compound (III) by treatment with a base to yield 11β,21 - dihydroxy - 4,16-pregnadien-3,20-dione 21-tetrahydropyranyl ether (IV).

15. A process in accordance with claim 12 for the production of 11β,21-dihydroxy-1,4,16-pregnatriene-3,20-dione 21-tetrahydropyranyl ether (IV) which comprises (1) subjecting 11β,21 - dihydroxy - 1,4,17(20) - cis-preg- natrien-3-one 2-tetrahydropyranyl ether (II) to photosensitized oxygenation to yield 20α-hydroperoxy-11β,21-dihydroxy-1,4,16-pregnatrien-3-one 21-tetrahydropyranyl ether (III) and (2) subjecting the thus produced compound (III) to dehydration at the 20-position to yield 11β,21 - dihydroxy-1,4,16-pregnatrien-3,20-dione 21-tetrahydropyranyl ether (IV).

16. A process in accordance with claim 12 for the production of 11β,21-dihydroxy-1,4,16-pregnatriene-3,20-dione 21-tetrahydropyranyl ether (IV) which comprises (1) treating 11β,21 - dihydroxy - 1,4,17(20) - cis-pregnatrien-3-one 21-tetrahydropyranyl ether (II) with oxygen in the presence of hematoporphyrin during irradiation with fluorescent light to yield 20α-hydroperoxy-11β, 21-dihydroxy-4,16-pregnadien-3-one (III) and (2) dehydrating at the 20-position the thus produced compound (III) by treatment with a base to yield 11β,21-dihydroxy-1,4,16-pregnatriene-3,20-dione 21-tetrahydropyranyl ether (IV).

17. A process for the production of a compound of the Formula IV.

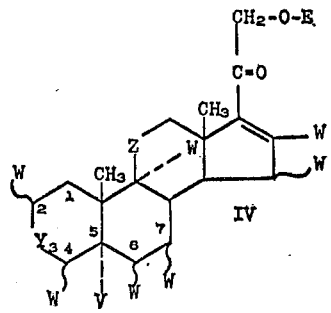

wherein 1(2), 3(4), 4(5), 5(6), and 6(7)-carbon atom linkages are selected from the group consisting of single bonds and double bonds; ~is a generic expression denoting α- and β-bonds and mixtures thereof; E is selected from the group consisting of

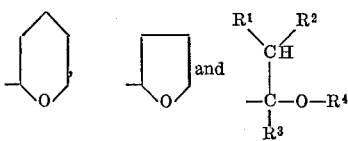

wherein R⁴ is selected from the group consisting of alkyl, haloalkyl, nitroalkyl, alkenyl, cycloalkyl, aryl, aralkyl, haloaryl, haloaralkyl and nitroaryl of from 1 to 24 carbon atoms, inclusive; and R¹, R² and R³ have the same meaning as R⁴ and in addition hydrogen; V is selected from the group consisting of hydrogen and hydroxy with the proviso that V is not present when the 4(5)- or 5(6)-carbon atom linkage is a double bond; W is selected from the group consisting of hydrogen, methyl, chlorine and fluorine; Y is selected from the group consisting of the α-hydroxymethylene radical

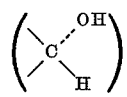

the β-hydroxymethylene radical

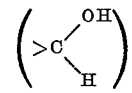

the α-acyloxymethylene radical

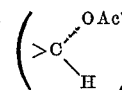

wherein Ac is the acyl radical of an organic carboxylic acid containing from one to twelve carbon atoms, inclusive, the β-acyloxymethylene radical

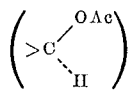

wherein Ac has the same meaning as above, the acyloxymethylidyne radical (≥C—OAc) wherein Ac has the same meaning as above, the alkoxymethyldyne radical (≥C—OR) wherein R is a lower-alkyl radical of from one to six carbon atoms, inclusive, the carbonyl radical (>C=O) and an alkylene ketal radical of the formula

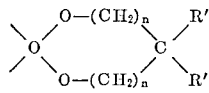

wherein $n$ is selected from the group consisting of zero and the integers one and two and R' is selected from the group consisting of hydrogen and a lower-alkyl radical containing from one to six carbon atoms, inclusive; when Y is a carbonyl radical, the 1(2), 4(5), 6(7) and 9(11)-carbon atom linkages are selected from the group consisting of single and double bonds; when Y is other than a carbonyl radical, the 1(2), 3(4), 4(5), 5(6), 6(7) and 9(11)-carbon atom linkages are selected from the group consisting of single and double bonds; Z is selected from the group consisting of the methylene radical, (>CH₂), the α-hydroxymethylene radical, the β-hydroxymethylene radical, the carbonyl radical and when W is selected from the group consisting of chlorine and fluorine, Z is additionally selected from the group consisting of chloromethylene and fluoromethylene; Z and W at the 9-position together constitute a 9(11)-double bond, which comprises subjecting to photosensitized oxygenation in a dehydrating medium a corresponding compound of the Formula II

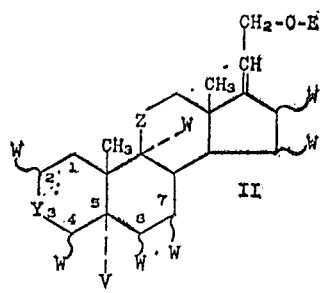

wherein 1(2), 3(4), 4(5), 5(6), 6(7), ~, E, V, W, Y and Z have the same meaning as above, to produce a corresponding compound of the Formula III

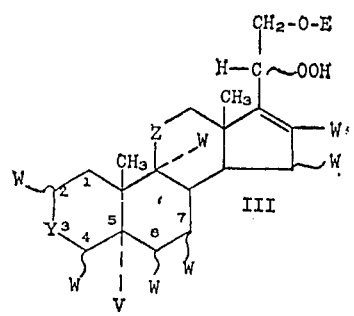

wherein 1(2), 3(4), 4(5), 5(6), 6(7), ~, E, V, W, Y and Z have the same meaning as above, and a thus produced corresponding compound of Formula III, without isolation from the reaction mixture, is dehydrated at the 20-position to yield a corresponding compound of Formula IV above.

18. A process for the production of a compound of the Formula V

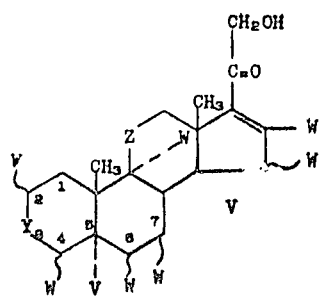

wherein 1(2), 3(4), 4(5), 5(6) and 6(7)-carbon atom linkages are selected from the group consisting of single bonds and double bonds; ~ is a generic expression denoting α- and β- bonds and mixtures thereof; V is selected from the group consisting of hydrogen and hydroxy with the proviso that V is not present when the 4(5)- or 5(6)-carbon atom linkage is a double bond; W is selected from the group consisting of hydrogen, metryl, chlorine and fluorine; Y is selected from the group consisting of the α-hydroxymethylene radical

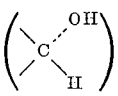

the β-hydroxymethylene radical

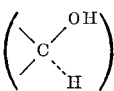

the α-acyloxymethylene radical

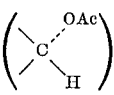

wherein Ac is the acyl radical of an organic carboxylic acid containing from one to twelve carbon atoms, inclusive, the β-acyloxymethylene radical

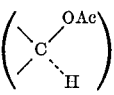

wherein Ac has the same meaning as above, the acyloxymethylidyne radical (≥C—OAc) wherein Ac has the same meaning as above, the alkoxymethylidyne radical (≥C—OR) wherein R is a lower-alkyl radical of from one to six carbon atoms, inclusive, the carbonyl radical (>C=O) and an alkylene ketal radical of the formula

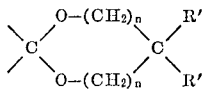

wherein $n$ is selected from the group consisting of zero and the integers one and two and R' is selected from the group consisting of hydrogen and a lower-alkyl radical containing from one to six carbon atoms, inclusive; when Y is a carbonyl radical the 1(2), 4(5), 6(7) and 9(11)-carbon atom linkages are selected from the group consisting of single and double bonds; when Y is other than a carbonyl radical the 1(2), 3(4), 4(5), 5(6), 6(7) and 9(11)-carbon atom linkages are selected from the group consisting of single and double bonds; X is selected from the group consisting of the methylene radical (>CH₂), the α-hydroxymethylene radical, the β-hydroxymethylene radical, the carbonyl radical and when W is selected from the group consisting of chlorine and fluorine, Z is additionally selected from the group consisting of chloromethylene and fluoromethylene; Z and W at the 9-position together constitute a 9(11)-double bond, which comprises:

(1) treating a corresponding compound of the Formula I

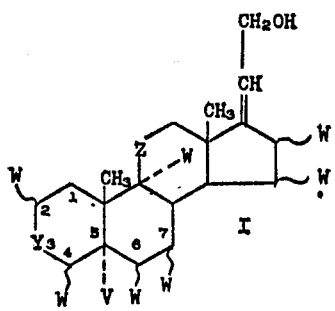

wherein 1(2), 3(4), 4(5), 6(7), ~, V, W Y and Z have the same meaning as above, with a vinyl ether in an acid medium to produce a corresponding compound of the Formula II

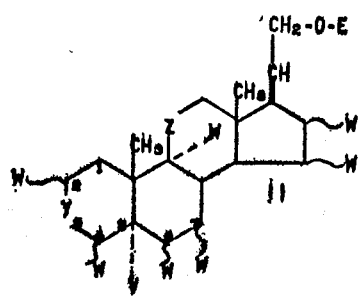

wherein E is selected from the group consisting of

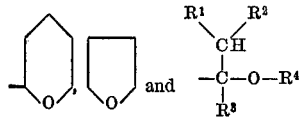

wherein $R^4$ is selected from the group consisting of alkyl, haloalkyl, nitroalkyl, alkenyl, cycloalkyl, aryl, aralkyl, haloaryl, haloalkaryl and nitroaryl of from 1 to 24 carbon atoms, inclusive, and $R^1$, $R^2$ and $R^3$ have the same meaning as $R^4$ and in addition hydrogen; 1(2), 3(4), 4(5), 5(6), 6(7), ~, V, W, Y and Z have the same meaning as above;

(2) subjecting a thus produced corresponding compound of Formula II to photosensitized oxygenation to yield a corresponding compound of the Formula III

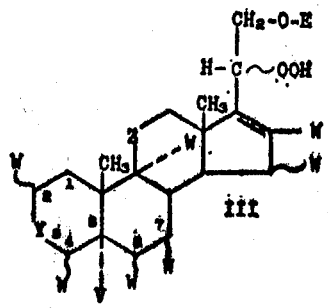

wherein 1(2), 3(4), 4(5), 5(6), 6(7), ~, E, V, W, Y and Z have the same meaning as above;

(3) subjecting a thus produced corresponding compound of Formula III to dehydration at the 20-position to yield a corresponding compound of the Formula IV

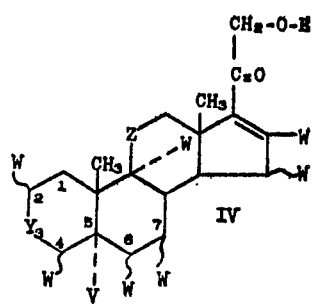

wherein 1(2), 3(4), 4(5), 5(6), 6(7), ~, E, V, W, Y and Z have the same meaning as above;

(4) hydrolyzing at the 21-position a thus produced corresponding compound of Formula IV to yield a corresponding compound of Formula V, above.

19. A process in accordance with claim 18 wherein the compound of Formula I is 11β,21-dihydroxy-4,17(20)-cis-pregnadien-3-one, the compound of Formula II is 11β,21-dihydroxy-4,17(20)-cis-pregnadien-3-one 21-tetrahydropyranyl ether, the compound of Formula III is 20α-hydroperoxy-11β,21-dihydroxy-4,16-pregnadien-3-one 21-tetrahydropyranyl ether, the compound of Formula IV is 11β,21 - dihydroxy-4,16-pregnadien-3,20-dione 21-tetrahydropyranyl ether and the compound of Formula V is 11β,21-dihydroxy-4,16-pregnadien-3,20-dione.

20. A compound in accordance with claim 1, namely, 20α - hydroperoxy - 11β,21 - dihydroxy-4,16-pregnadien-3-one 21-(1'-methoxy-1'-methylethyl)ether.

References Cited

UNITED STATES PATENTS

| 3,082,219 | 3/1963 | Slates et al | 260—397.3 |
| 3,116,304 | 12/1963 | Taub et al. | 260—397.45 |
| 3,280,157 | 10/1966 | Legatt et al. | 260—397.4 |
| 3,281,415 | 10/1966 | Schneider et al. | 260—239.55 |
| 3,062,846 | 11/1962 | Fried | 260—397.4 |
| 3,376,292 | 4/1968 | Beard et al. | 260—239.5 |

OTHER REFERENCES

Fieser et al.: Steroids, pp. 235–36 (1959).

HENRY A. FRENCH, Primary Examiner

U.S. Cl. X.R.

204—158; 260—397.45, 397.47, 397.5, 999